United States Patent [19]

Fujimoto

[11] Patent Number: 4,655,921
[45] Date of Patent: Apr. 7, 1987

[54] FILTER ELEMENT

[75] Inventor: Etsuo Fujimoto, Yokohama, Japan

[73] Assignee: Tokyo Roki Co., Ltd., Kanagawa, Japan

[21] Appl. No.: 705,128

[22] Filed: Feb. 25, 1985

[30] Foreign Application Priority Data

Jul. 3, 1984 [JP] Japan .............................. 59-99600[U]

[51] Int. Cl.⁴ ............................................ B01D 29/06
[52] U.S. Cl. .................................. 210/489; 210/493.5; 55/489; 55/500; 55/510; 55/521
[58] Field of Search ............... 210/493.1, 493.3, 493.5, 210/483, 488, 489; 55/484, 489, 510, 521, 529, 500

[56] References Cited

U.S. PATENT DOCUMENTS

| 3,231,094 | 1/1966 | Wiegand | 210/493.1 |
| 3,371,790 | 3/1968 | Kudlaty et al. | 210/493.1 |
| 4,154,688 | 5/1979 | Pall | 210/493.1 |
| 4,522,719 | 6/1985 | Kuwajima et al. | 210/493.1 |

FOREIGN PATENT DOCUMENTS

| 549311 | 11/1957 | Canada | 210/493.1 |
| 112558 | 12/1982 | European Pat. Off. | 210/493.1 |
| 140672 | 7/1978 | Japan | 210/493.1 |
| 734358 | 7/1955 | United Kingdom | 210/493.1 |
| 781864 | 8/1957 | United Kingdom | 210/493.1 |

Primary Examiner—Richard V. Fisher
Assistant Examiner—Wanda L. Millard
Attorney, Agent, or Firm—Barnes & Thornburg

[57] ABSTRACT

A filter element suitable for use in a filter device such as air cleaner, oil filter or fuel filter for an automobile is disclosed. It includes a pair of end plates and a filter paper which is disposed between the end plates and folded so as to form rectangular-shaped sections, thus folded filter paper forming a hollow cylinder. The cylinder is divided into a plurality of portion areas by virtual planes extending in the radial direction thereof, and the rectangular-shaped sections in each of the portion areas are arranged such that every other sections are maintained in a parallel relation with predetermined spaces therebetween.

9 Claims, 3 Drawing Figures

FILTER ELEMENT

BACKGROUND OF THE INVENTION

This invention relates to an improvement of a paper-type filter element which is to be used for a filter device such as an air cleaner, oil filter or fuel filter for an engine of automobile.

As known, a conventional filter element used for such a filter device as mentioned above is formed of a long belt-shaped filter paper folded into an accordion shape by folding it reversedly in multiplicity at certain length, said filter paper being disposed between a pair of parallel doughnut-shaped end plates in such a manner as to form a hollow cylinder as a whole. That is, as shown in FIG. 1, many numbers of rectangular sections 2 continuously connected with each other through ridge portions 1 are arranged radially and disposed between a pair of parallel end plates 3 to form a hollow cylinder 4.

There are two ways for increasing or enlarging the filtering area of filter element of this type; one is to increase the outer diameter R1 of said hollow cylinder 4 and to decrease the inside diameter R2 thereof for increasing the areas of the respective sections 2, and the other is to increase the density of arrangement of the respective sections 2 for increasing the number of sections 2. If said diameters R1 and R2 should be restricted due to some factors, only the latter way is made available.

In this case, there is a limit to increase the density of arrangement of the sections since it is required to provide sufficient spaces between adjacent sections thereby to permit smooth flow of a fluid which is to be filtered. This renders the upper limit of the density in arrangement of the filter paper.

According to the conventional element as shown in FIG. 1, the respective sections 2 of the filter paper are arranged generally radially and are symmetric with respect to the center of the cylinder 4. Therefore, the distance P1 between the adjacent ridge portions 1,1 at the inner peripheral side is smaller than the distance P2 therebetween at the outer peripheral side. In other words, the density of the filter paper thus arranged is high at the inner peripheral side and low at the outer peripheral side.

Consequently, even if the filter paper is so arranged as to have a density of maximum permissible value at the inner peripheral side, a waste of space is formed at the outer peripheral side since the arrangement of the filter paper is rough at the outer peripheral side than that at the inner peripheral side.

In this way, according to the conventional element, since the difference of the density in arrangement of the filter paper is necessarily produced, even if the density should be increased to be maximum permissible value, the wasteful space formed in the wide range of its outer peripheral side could not be eliminated substantially.

The present invention is accomplished in view of the above.

SUMMARY OF THE INVENTION

It is therefore a general object of the present invention to provide a filter element having a large filtering area wherein the difference of density in arrangement of filter paper within a hollow cylinder is eliminated thereby to get rid of room to produce a wasteful space therein and to permit the filter paper to be arranged with high density.

In order to obtain the above object, there is essentially provided a filter element comprising a pair of end plates arranged in a parallel relation with respect to each other; and a filter paper folded so as to form a large number of rectangular-shaped sections continuously connected with respect to each other through ridge portions and disposed between said end plates in the erected state to form a generally hollow cylinder as a whole, said hollow cylinder being divided into a plurality of portion areas by virtual planes extending in the radial direction thereof, said rectangular-shaped sections in each of such divided portion areas being arranged such that every other rectangular-shaped sections are maintained in a parallel relation with predetermined spaces therebetween.

Other objects, features and advantages of the present invention will be apparent from the following detailed description of preferred embodiments thereof when taken in conjunction with the accompanying drawings, in which:

DETAILED DESCRIPTION OF THE INVENTION

Preferred embodiments of the present invention will be described hereunder with reference to the accompanying drawings.

Figure 1:
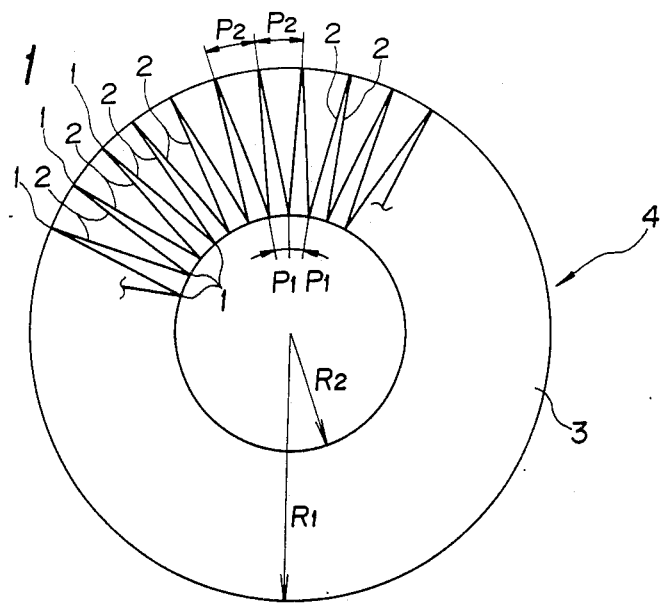
FIG. 1 is a schematic illustration showing a conventional filter element.
Figure 2:
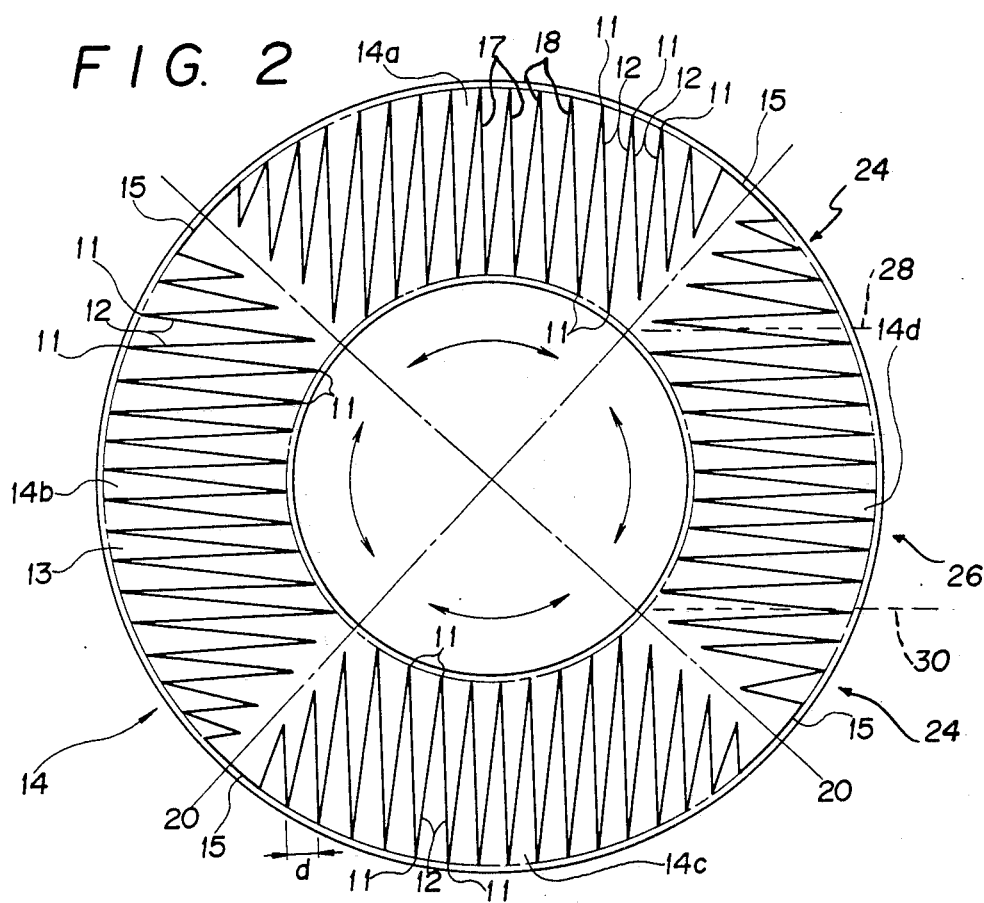
FIG. 2 is likewise a schematic view illustrating a filter element according to an embodiment of the present invention.

FIG. 2 illustrates a filter element according to one embodiment of the present invention. The filter element illustrated in this figure includes a large number of rectangular-shaped sections 12 of folded filter paper and interposed between a pair of doughnut shaped end plates 13 which are arranged parallel with each other, and the filter paper thus folded defines a generally hollow cylinder 14 as a whole. Said rectangular-shaped sections 12 are continuously connected with respect to each other through ridge portions 11. So far, the constitution of the present filter element is the same as that of the conventional ones.

The characteristic feature of the present invention resides in arrangement pattern of the sections 12. That is, the cylinder 14 is equally divided into four portion areas 14a, 14b, 14c and 14d each defined by virtual planes 20,20 which extend in the radial direction of the cylinder 14 and are crossed with each other at 90 angles. The filter paper sections 12 are arranged in such a manner that the arrangement pattern thereof in one of the portion areas and in the adjacent area constitute 90 angles with respect to each other. In other words, each portion area has the same pattern when viewed from the center of the cylinder 14.

In each of the portion areas 14a through 14d, the sections 12 are so arranged that every other sections 17 are kept in parallel with respect to each other with a predetermined space d therebetween. The remaining every other sections 18 are also arranged to be generally parallel with respect to each other. The term "generally" is used since the lengths between the ridge portions 11 at the inner peripheral side and at the outer peripheral side are varied as shown in the figure, they are not parallel in the strict sense of the word.

The paralleled every other sections 12 are extended in a direction parallel to virtual radius line passing through the respective centers of the respective portion areas 14a through 14d.

The length between the two opposite ridge portions 11,11 of the rectangular-shaped section 12 varies in accordance with location of the section 12, that is, the sections 12 vary their size because of the configuration of the portion areas defined by the inner and outer peripheries and the virtual planes 20, as seen from the figure. The sections 12 within each portion area comprise first and second alternating variant length groups. Referring to portion area 14d in FIG. 2, the sections 12 are divided into two groups 24, 26 by dotted lines 28, 30. The sections 12 in group 26 have a substantially uniform radial length. The sections 12 in group 24 have radial lengths that vary toward the adjacent portion areas 14a, 14c, with the inner ridge portions 11 generally aligned with the corresponding virtual plane 20. Connections 15 formed of the filter paper are provided at boundaries of the portion areas to integrally connect the endmost sections 12 in each portion area to those in the adjacent areas. These connection lines 15 permit the cylinder 14 to be formed of a single belt-shaped filter paper.

Figure 3:
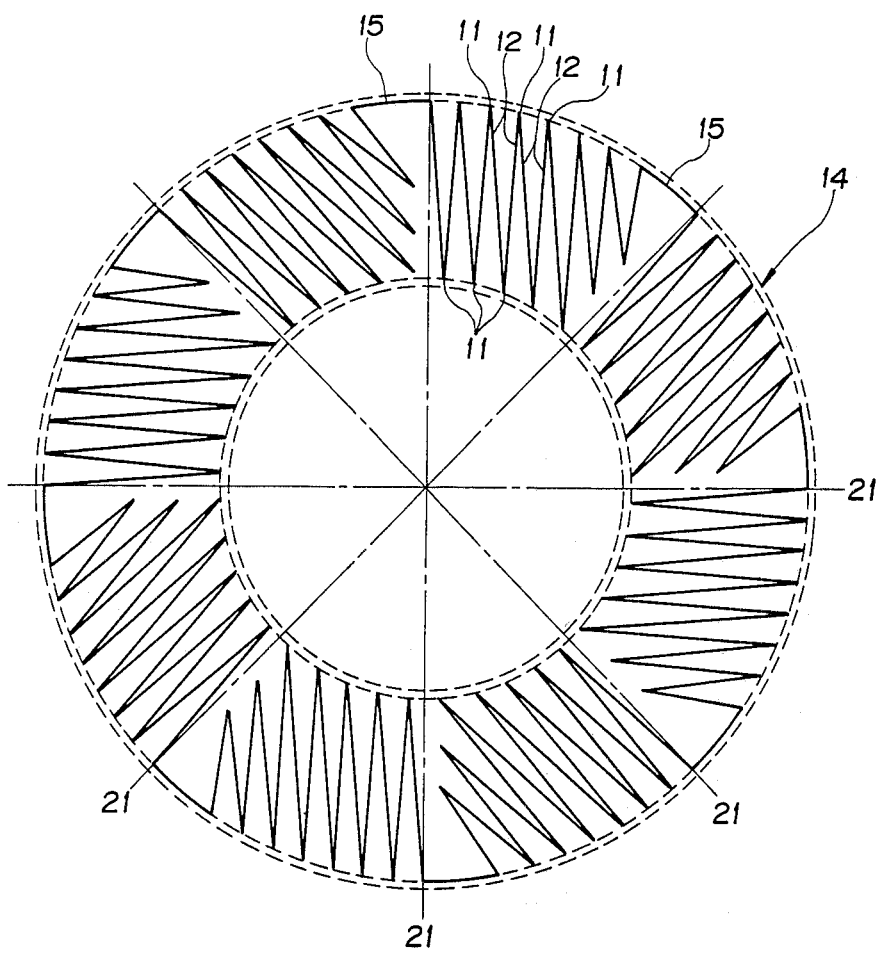
FIG. 3 is a schematic view of a filter element according to another embodiment of the present invention.

In the above embodiment, the cylinder 14 is equally divided into four portion areas each to constitute a unit for the arrangement pattern. However, number of the portion area is not limited to the above, and the cylinder 14 may be divided into 3 or less, or 5 or more portion areas. FIG. 3 illustrates another embodiment of the present invention wherein the cylinder 14 is equally divided into eight portion areas by four virtual planes 21. The rectangular-shaped sections 12 are arranged in the respective portion areas with the same pattern when viewed from the center of the cylinder.

As it could be understood from the foregoing description, according to the present invention the rectangular sections of the folded filter paper can be arranged with equal density at the inner and outer peripheries of the cylinder due to the parallel relation of every other sections. This equality in the density permits the adjacent sections to be arranged with minimum space therebetween, but without preventing smooth flow of a fluid at the inner periphery of the cylinder and without defining a wasteful space at the outer periphery thereof. Therefore, the overall filtering area, which is a total of individual sections, can be apparently increased when compared with conventional filter element having the same diameter.

Although the present invention has been described with reference to the preferred embodiments thereof, it should be understood that many modifications and alterations may be made within the spirit of the present invention.

What is claimed is:

1. A filter element comprising:
a pair of end plates arranged in a parallel relation with respect to each other; and
a filter paper folded so as to form a large number of rectangular-shaped sections continuously connected with respect to each other through ridge portions and disposed between said end plates in the erected state to form a generally hollow cylinder, said hollow cylinder being defined between an outer periphery along which outer ridge portions of said rectangular-shaped sections are arranged, and an inner periphery, said hollow cylinder being divided into at least four portion areas by virtual planes extending in the radial direction thereof, said rectangular-shaped sections in each of said portion areas comprising at least first and second alternating variant length groups and being arranged such that every other sections are maintained in a parallel relation with predetermined spaces therebetween, the rectangular shaped sections in said first group having a substantially uniform length in the radial direction and having inner ridge portions arranged along said inner periphery, and the rectangular-shaped sections in said second group varying the length toward the adjacent portion area and including inner ridge portions substantially aligned with said virtual plane.

2. A filter element as claimed in claim 1, wherein said portion areas have equal size.

3. A filter element as claimed in claim 2, wherein said rectangular-shaped sections are arranged in each said portion area with the same pattern.

4. A filter element as claimed in claim 1, wherein said rectangular-shaped sections positioned at the ends of each said portion area are integrally connected to those in the adjacent portion areas through connection lines formed of said filter paper.

5. The filter element as claimed in claim 1, wherein said predetermined spaces between said parallel sections are equal in size.

6. A filter element comprising:
a pair of end plates arranged in a spaced apart, parallel relation with each other;
a cylindrically shaped outer wall extending between said end plates;
a cylindrically shaped inner wall concentric with said outer wall, said inner wall and said outer wall cooperating to form an annular space;
a continuous sheet of filter paper folded to form a plurality of rectangular-shaped sections disposed in said annular space, said rectangular-shaped sections extending between said outer wall and said inner wall and connected by outer ridge portions adjacent said outer wall and inner ridge portions adjacent said inner wall, said sections spaced apart from each other except at said outer and inner ridge portions;
said annular space being divided into at least four portions by virtual planes extending radially from the center of a circle defined by said inner wall, said rectangular-shaped sections in each portion comprising at least first and second alternating variant length groups and arranged such that every other section is in a parallel relation with predetermined spaces therebetween, the rectangular-shaped sections in said first group having a substantially uniform radial length and the rectangular-shaped sections in said second group varying in length toward the adjacent portion with said inner ridge portions generally aligned with said corresponding virtual plane and wherein the circumferential distance between adjacent outer ridge portions and the circumferential distance between adjacent inner ridge portions are substantially equal.

7. The filter element of claim 6, wherein said predetermined spaces between said every other section are equal in size.

8. The filter element of claim 6, wherein said portions are of equal size.

9. The filter element of claim 6, wherein the sections in each portion are generally parallel to one of said virtual planes defining said each portion.

* * * * *